United States Patent [19]

Zerbe

[11] 4,318,317
[45] Mar. 9, 1982

[54] APPARATUS FOR ASSEMBLING TROPHIES
[75] Inventor: Lowell B. Zerbe, Columbus, Ind.
[73] Assignee: Earl Nonnemann, Cumberland, Md.
[21] Appl. No.: 199,979
[22] Filed: Oct. 23, 1980
[51] Int. Cl.³ .............................................. B25B 23/14
[52] U.S. Cl. ...................................... 81/467; 29/240; 81/57.4
[58] Field of Search ...................... 81/467, 57.4, 57.24; 29/240

[56] References Cited
U.S. PATENT DOCUMENTS 922,221   5/1909  Wanner ................................. 81/57.4
2,301,438  11/1942  Moeller ................................ 81/57.4
4,058,884  11/1977  Lydon et al. ........................... 29/240

Primary Examiner—James L. Jones, Jr.
Attorney, Agent, or Firm—Jenkins, Coffey, Hyland, Badger & Conard

[57] ABSTRACT

An apparatus for assembling the components of a trophy includes a socket for engaging a nut employed to connect the components, a bidirectional motor coupled to the socket, a clutch mechanism coupling the bidirectional motor to the socket, a spring retained between the motor and the socket to allow axial movement of the socket relative to the motor, and a bracket for adjustably mounting the motor, clutch mechanism, and spring beneath a work surface for supporting the components of the trophy. The socket is biased upward by the spring so that it projects above the working surface. The motor is operable in a first direction to tighten the nut and in a second direction to loosen the nut. The clutch mechanism provides a torque-limited connection between the motor and the socket in the first direction to prevent excessive tightening of the nut and a positive connection in the second direction to loosen the nut.

12 Claims, 5 Drawing Figures

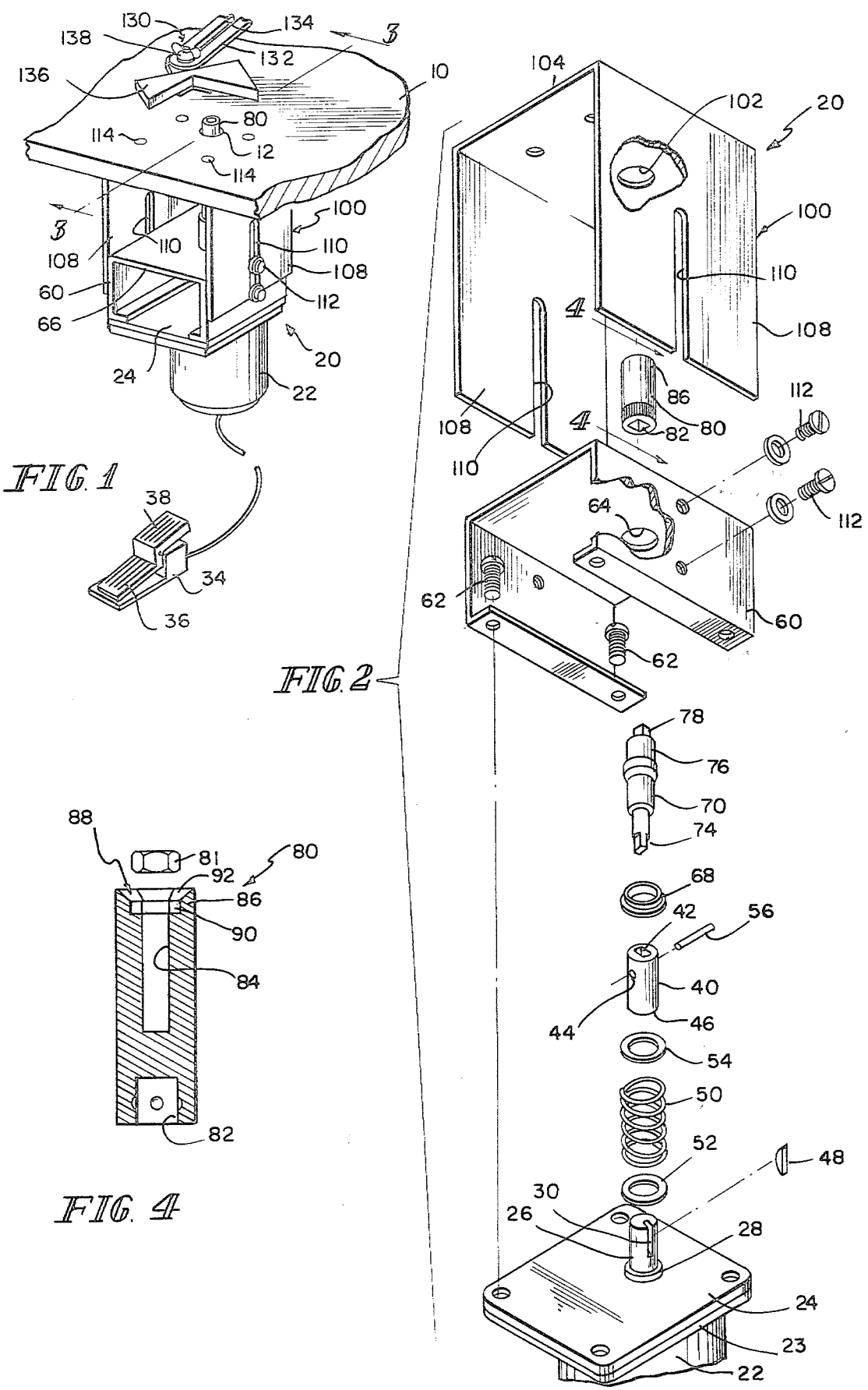

APPARATUS FOR ASSEMBLING TROPHIES

The present invention relates to apparatus employed for assembling the components of a trophy. More particularly, the present invention is concerned with an apparatus which is mountable to a work surface for supporting the components of the trophy and which is operable by the foot of the operator to activate, deactivate and control the operation of the apparatus, thereby leaving the operator's hands free to align the components on the work surface prior to and during the assembly of the trophy.

The trophy industry has grown substantially in the past few years; however, the automation of the assembly process for trophies has lagged behind the growth of the industry. Presently, the components of a trophy are assembled by first loosely connecting the components and, while holding the loosely connected components in one hand, tightening the connection between the components with the other hand. In other words, the assembly is done manually by one or more workers. It can be appreciated that regardless of the skill of the workers, considerable time is required to align components and to tighten the connection between the components while maintaining the proper alignment therebetween. Although various power tools are available for tightening the connection between the trophy components, those tools must be held by the worker with one hand while the components are held in the worker's other hand. Frequently, in the process of tightening the connection, the two components of the trophy will become misaligned. In these frequent situations, the connection must be loosened and the trophy components realigned before again tightening the connection therebetween. The trophy industry has needed an apparatus for assembling trophies which would increase the speed with which the components of the trophy could be aligned and assembled.

It is therefore one object of the present invention to provide an apparatus for assembling the components of a trophy which frees the hands of the operator so that both hands may be used to align the components of the trophy prior to and during assembly, thereby reducing the amount of time required for the assembly of each trophy.

It is another object of the present invention to provide an apparatus having the advantages described above which is operable in a first direction to tighten the connection between the components of the trophy and is operable in a second direction to loosen the connection between the trophy components wherein the operator of the apparatus can activate, deactivate and control the direction of operation of the apparatus by a foot switch.

Still a further object of the present invention is to provide an apparatus as described above which is mountable to a working surface for supporting the components of the trophy and which properly positions and aligns at least one of the components on the surface and prevents it from moving during assembly of the trophy. These features facilitate the handling of the trophy components to reduce the overall assembly time for each trophy.

In one illustrative embodiment of the present invention, the apparatus includes a socket for engaging a nut used to connect the trophy components, a bidirectional motor coupled to the socket, a clutch mechanism coupling the bidirectional motor to the socket, a spring retained between the motor and the socket to allow axial movement of the socket relative to the motor, a bracket for adjustably mounting the motor to a working surface for supporting the components of the trophy so that the socket is biased upward by the spring through an opening provided in the working surface, a locating arm adjustably mounted to the working surface for positioning at least one component of the trophy adjacent the socket, and a switch operable by the foot of the operator to activate, deactivate and control the direction of operation of the motor. The bidirectional motor is operable in a first direction to tighten the nut and in a second direction to loosen the nut and the clutch mechanism provides a torque-limited connection between the motor and the socket in the first direction to prevent excessive tightening of the nut and a positive connection in the second direction to loosen the nut.

According to the present invention, the socket includes a recessed portion for retaining the nut and an elongated cavity extending axially inward from the recessed portion. The outer periphery of the recessed portion is beveled to facilitate removal of the nut from the socket if, for example, the nut is either defective or damaged during the assembly process.

Various other features and advantages of the present invention will become apparent in view of the following detailed description of one embodiment thereof, which description should be viewed in conjunction with the accompanying drawings, in which:

FIG. 1 is a perspective view, partly broken away, of an apparatus according to the present invention;

FIG. 2 is an exploded view, partly broken away, showing the relationship of the various elements of the apparatus shown in FIG. 1;

FIG. 4 is a cross-sectional view of one element of the apparatus shown in FIGS. 1-3 taken generally along section lines 4—4 in FIG. 2.

Figures 3, 5:
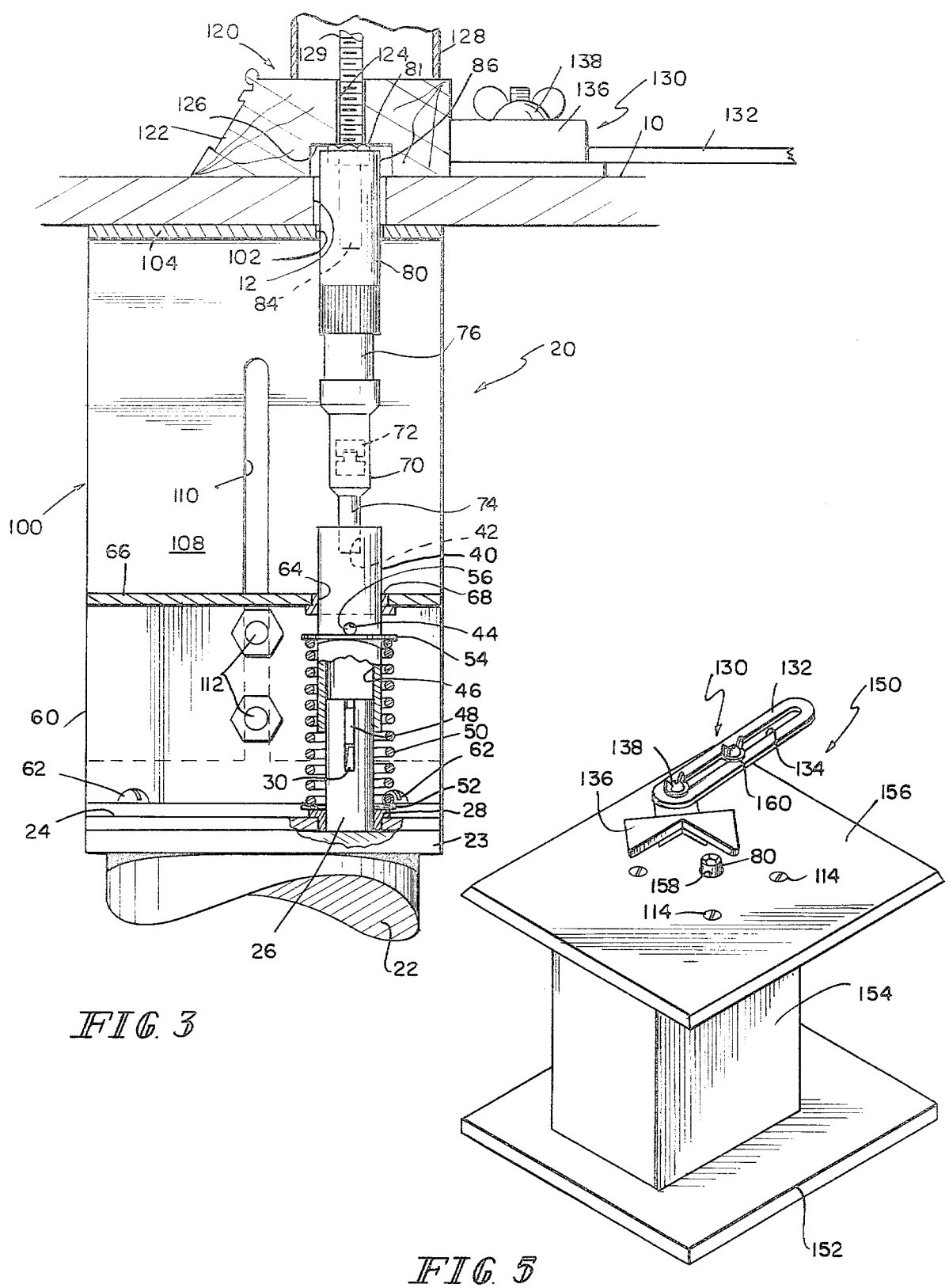
FIG. 3 is a transverse view, partly broken away, of the apparatus shown in FIGS. 1 and 2 taken generally along section lines 3—3 of FIG. 1.
FIG. 5 is a perspective view of another embodiment of the apparatus according to the present invention.

Referring to FIG. 1, one embodiment of the present invention is shown mounted to a horizontal working surface 10, such as, for example, a tabletop, which includes a circular aperture 12. As shown more particularly in FIGS. 2 and 3, an apparatus 20 for assembling trophies includes a bidirectional motor 22 having a mounting surface 23 and an adapter plate 24 connected to the mounting surface 23. The motor 22 includes an output shaft 26 which extends through a bushing 28 provided in the adapter plate 24. The output shaft 26 includes an elongated keyway 30 which is used to axially connect the shaft 26 to a series of couplings to drive the apparatus 20 in first and second directions.

Although other bidirectional motors may be used, one motor which is known to have the capability for driving the apparatus 20 in the first and second directions is the in line gearmotor No. 2Z840A manufactured by Dayton Electric Manufacturing Company, Chicago, Ill. This motor is reversible and has an operating speed of 100-120 RPM.

Referring again to FIG. 1, a foot switch 34 is electrically connected to the motor 22. The foot switch includes a forward pedal 36 and a reverse pedal 38 which allow the operator of the apparatus 20 to activate, deactivate, and control the direction of operation of the motor 22 by foot, thereby leaving the operator's hands free for other uses. Although other foot switches may be used, a momentary foot switch manufactured by Linemaster Switch Corporation, Woodstock, Conn., and identified by either No. L-2-S or L-4-S has been found to satisfy the requirement for a foot operable switch.

Continuing to refer to FIGS. 2 and 3, a first drive coupling 40 is sleeved over the output shaft 26 of the motor 22. The first drive coupling 40 is generally cylindrical at one end and includes an axially extending rectangular opening 42. Provided in proximity to the one end is a radially extending aperture 44 which intersects the rectangular opening 42. At the other end of the coupling 40, opposed to the rectangular opening 42, is an axially extending circular opening 46 for slidably receiving the output shaft 26 of the motor 22. Formed on the inner surface of the circular opening 46 is another keyway (not shown). A key 48 engages the elongated keyway 30 provided in the shaft 26 of the motor 22 and the keyway (not shown) formed in the circular opening 46 to prevent rotation of the first drive coupling 40 relative to the shaft 26 while allowing axial movement of the first drive coupling 40 relative to the shaft 26. Rotation of the output shaft 26 of motor 22 therefore causes a corresponding rotation of the first drive coupling 40.

Sleeved over the first drive coupling 40 and the output shaft 26 is a compression spring 50 which is retained between a washer 52 sleeved over the output shaft 26 and supported by the bushing 28, and a washer 54 sleeved over the first drive coupling 40 and maintained in position by a pin 56 which extends radially through the aperture 44 of the first drive coupling 40 to engage the upper surface of the washer 54. While the compression spring 50 biases the first drive coupling 40 vertically upward and away from the motor 22, it also allows the first drive coupling 40 to be depressed and moved axially toward the motor 22.

The output shaft 26 of the motor 22, the first drive coupling 40, and the compression spring 50 are contained within a housing 60 which is secured to the adapter plate 24 of the motor 22 by bolts 62. A circular opening 64 is formed in the upper surface 66 of the housing 60; and when the housing 60 is mounted to the adapter plate 24, the opening 64 is aligned and concentric with the axis of the output shaft 26 and first drive coupling 40. As particularly shown in FIG. 3, the first drive coupling 40 is retained and guided in the opening 64 by a bushing 68 and extends axially upward through the opening 64 to the exterior of the housing 60. The bushing 68 allows axial movement of the first drive coupling 40 relative to the upper surface 66 of the housing 60.

A second drive coupling 70 includes a torque breakaway clutch 72 and a generally rectangular end 74 adapted to fit axially into the rectangular opening 42 of the first drive coupling 40. The other end 76 of the second coupling 70 includes a generally rectangular adapter 78 for engaging a socket 80. The torque breakaway clutch 72 provides a torque-limited connection between the output shaft 26 of the motor 22 and the socket 80 in the first direction of operation of the motor 22 and a positive connection between the shaft 26 and the socket 80 in the second direction of operation. While other clutches 72 may be used, an O-Series adjustable ball-type clutch manufactured by Aro and identified by type No. 38311-2 has been found acceptable.

Illustratively, the adapter 78 provided on the end 76 of the second drive coupling 70 is three-eighths inch (0.9525 cm.) square; however, other adapter sizes may be used depending upon the nature and size of the socket 80 without departing from the scope of the present invention.

Referring to FIG. 4, a socket 80 constructed according to the present invention for retaining a nut 81 has one end 82 which includes a generally rectangular opening for engaging the adapter 78 of the second drive coupling 70. The other end 86 of the socket 80 includes an elongated generally cylindrical cavity 84 which extends axially inward and a recessed section 88 formed adjacent the end 86 and communicating with the cavity 84 for receiving the nut 81. The recessed section 88 includes a polyagonal portion 90 corresponding to the polyagonal shape of the periphery of the nut 81 for retaining the nut 81 and a beveled portion 92 around the periphery of the polyagonal portion 90 which is filed down to facilitate access to and removal of the nut 81 from the polyagonal portion 90 of the socket 80. In one illustrative embodiment, the socket 80 is two inches (5.04 cm.) long and the elongated cavity is one-quarter inch (0.635 cm.) in diameter to receive a portion of a shaft (not shown) as the nut 81 is threadably secured to the shaft.

The apparatus 20 further includes an adjustable mounting bracket 100 having a circular opening 102 formed in its top surface 104. Extending downwardly from the top surface 104 of the bracket 100 are two side panels 108 each of which includes a vertically extending elongated slot 110. The mounting bracket 100 is adjustably secured to the housing 60 by screws 112 which engage the elongated slots 110. When the mounting bracket 100 is secured to the housing 60, the circular opening 102 is aligned and concentric with the axis of the shaft 26, the couplings 40, 70, and the socket 80 so that the socket 80 projects axially upward through the opening 102. The mounting bracket 100 is mountable to the bottom of the horizontal working surface 10 by screws 114 in a location so that the socket 80 also projects axially upward through the opening 12 in the working surface 10. By loosening the screws 112, the motor 22, couplings 40, 70, and the socket 80 are movable vertically relative to the horizontal working surface 10 to accommodate for various thicknesses of working surfaces 10. Therefore, regardless of the thickness of the horizontal working surface 10, the apparatus 20 is adjustable to assure that the socket 80 always extends axially upward through the circular opening 12 provided in the working surface 10.

As shown in FIG. 3, a typical trophy 120 includes a first component 122 (base) having an opening 124 extending vertically therethrough and a recessed area 126 provided adjacent to the opening 124 on the bottom of the component 122. The trophy 120 also includes a second component 128 (figurine) having a threaded shaft 129 which is inserted through the opening 124 of the first component 122 so that it projects into the recessed area 126. The second component 128 is then connected to the first component 122 by a nut 81 which is threaded and tightened onto the shaft 129.

In order to further facilitate the assembly of the trophy 120, the apparatus 20 of the present invention further includes an adjustable locating bracket 130 which is movably mounted to the horizontal work surface 10 to align and position the first component 122 of the trophy 120 so that the recessed area 126 of the first component 122 is properly positioned over the socket 80 which projects upwardly through the opening 12 in the mounting surface 10. The locating bracket 130 includes an elongated arm 132 which is movably mounted to the working surface 10. The elongated arm 132 includes an elongated slot 134 and a locating or positioning member 136 is movably connected to the arm 132 by a wing nut 138. The positioning member 136 is movable along the arm 132 and the arm 132 is pivotable and likewise movable relative to the working surface 10 to assure proper positioning of the first component 122 of the trophy 120 relative to the socket 80. Once the proper position has been established for a first component 122 of a predetermined size, the arm 132 and locating member 136 can be fixed in position relative to the working surface 10 by tightening the wing nut 138 and the means securing the arm 132 to the working surface 10 so that, as each trophy 120 is assembled, the first component 122 will be properly positioned and maintained in position by the locating bracket 130 during assembly.

In some working environments there may not be a horizontal working surface 10 available for supporting the trophy assembling apparatus 20 of the present invention. Shown in FIG. 5 is a self-contained trophy assembling apparatus 150 constructed according to the present invention which includes its own base 152, a closure 154 for housing each of the components of the apparatus 20 shown in FIG. 2, and a generally rectangular working surface 156 supported by the mounting bracket 100 using the screws 114. The working surface 156 includes an opening 158 which is aligned and concentric with the axis of the output shaft 26 of the motor 22, the couplings 40, 70, and the socket 80.

Mounted to the top of the working surface 156 is the locating bracket 130. The elongated arm 132 of the locating bracket 130 is secured to the working surface 156 by a wing nut 160 and is movable relative to the working surface 156 in the manner previously described to position and locate the first component 122 of a trophy 120 relative to the upwardly projecting socket 80.

Having described the details of the present invention, its operation can best be understood by referring to all of the figures in combination. By describing the operation of the present invention, it will be appreciated how the apparatus 20 reduces the amount of time required to assemble the components 122, 128 of a trophy 120.

The locating bracket 130 is initially adjusted for the size and shape of the first component 122 of the particular trophy 120 to be assembled so that the recessed area 126 in the first component 122 will be properly positioned and aligned over the socket 80 as each first component 122 is positioned in the positioning member 136. It should be noted that different types of trophies 120 may include first components 122 having various sizes and shapes; and therefore, the locating bracket 130 must be adjustable to accommodate and properly position each first component 122 relative to the socket 80. A nut 81 is placed in the recessed section 88 of the socket 80 and a first component 122 of trophy 120 is located in position adjacent to the socket 80. A second component 128 is aligned on the first component 122 so that the threaded shaft 129 extends through the opening 124 provided in the first component 122 and engages the nut 81 retained in the socket 80. The socket 80 is deflected axially downward so that the first component 122 rests firmly against the working surface 10 or 156. The operator activates the motor 22 by depressing the forward pedal 36 of the foot switch 34 to rotate the socket 80 in a first direction. Rotation of the socket 80 in the first direction advances the nut 81 onto the shaft 129 to connect the second component 128 to the first component 122. When the nut 81 is sufficiently tightened to the shaft 129 so that the torque associated with the socket 80 exceeds a predetermined limit of the clutch 72, the clutch breaks away or slips to prevent excessive tightening of the nut 81. During this operation, both of the operator's hands are free to hold the second component 128 and maintain its proper alignment with the first component 122 while the nut 81 is tightened onto the shaft 129.

Should the nut 81 be improperly threaded onto the shaft 129 or the second component 128 be misaligned on the first component 122, the operator's foot may be removed from the forward pedal 36 of the foot switch 34 and placed on the reverse pedal 38 to reverse the direction of the motor 22 to rotate the socket 80 in a second direction and thereby loosen the nut 81 from the shaft 129. The components 122, 128 can then be removed from the working surface 10 or 156 and removal of the nut 81 from the socket 80 is facilitated by the beveled portion 92 formed around the periphery of the socket 80. Those skilled in the art can appreciate that in most sockets the nut 81 must be removed by employing a tool to pry the nut 81 out of the recessed section 88 of the socket 80. The unique construction of the socket 80 of the present invention allows the nut 81 to be easily removed by the operator's finger without the use of other objects or tools to pry the nut 81 from the recessed section 88.

Once the nut 81 has been tightened onto the shaft 129 to connect the components 122, 128, the trophy 120 is assembled. The assembled trophy 120 is removed from the working surface 10 or 156 and another nut 81 is placed in the socket 80. Another first component 122 is placed in the locating bracket 130 so that it is properly positioned and aligned relative to the socket 80 and the steps enumerated above are repeated to connect the components 122, 128 of another trophy 120. One important feature of the present invention is that both of the operator's hands are free to continuously place first component 122 in the locating bracket 130, to align the second component 128 relative to the first component 122, and to remove the finished trophy assembly 120. This feature, in combination with other features associated with the apparatus 20 of the present invention, allows an operator to assemble a greater number of trophies 120 within a defined time period than allowed by previous apparatus used in the trophy industry.

What is claimed is:

1. An apparatus for assembling the components of a trophy, comprising means for engaging a member for interconnecting the components, means for driving the engaging means in at least one direction to advance the interconnecting member and thereby connect the components together, means for coupling the driving means to the engaging means, means for adjustably mounting the driving means and coupling means to a working surface for supporting the components, and means for projecting the engaging means through the working surface, the coupling means providing a torque-limited connection between the driving means and the engaging means in the one direction to prevent the application of excessive force to the interconnecting member.

2. The apparatus as recited in claim 1 wherein the projecting means includes a resilient member retained between the driving means and engaging means for biasing the engaging means through the working surface and for permitting axial movement of the engaging means relative to the driving means.

3. The apparatus as recited in claim 2 further comprising switch means for controlling the operation of the driving means, the driving means being bidirectionally operable to drive the engaging means in a second direction to retract the interconnecting member, the direction of operation and the activation and deactivation of the driving means being controlled by the switch means.

4. The apparatus as recited in claim 3 further comprising locating means adjustably mounted to the working surface for positioning at least one of the trophy components on the working surface relative to the engaging means.

5. The apparatus as recited in claim 4 wherein the resilient member retained between the driving means and engaging means is a compression spring which urges the engaging means through the working surface and allows it to be depressed so that the one component of the trophy rests firmly on the working surface.

6. The apparatus as recited in claim 1 wherein the engaging means includes a socket, one end of the socket including means for removably connecting the socket to the coupling means to allow interchangeability of sockets, and the other end of the socket including a recessed section for retaining a portion of the interconnecting member, the periphery of the recessed section of the socket being beveled to facilitate removal of the portion of the interconnecting member from the socket.

7. The apparatus as recited in claim 1 wherein the coupling means includes a clutch which is torque-limited in the one direction.

8. An apparatus for assembling the components of a trophy comprising a socket for engaging a nut for interconnecting the components, a bidirectional motor coupled to the socket; the motor being operable in a first direction to tighten the nut on a thread shaft to connect the components and in a second direction to loosen the nut, a clutch providing a torque-limited connection between the motor and the socket in the first direction to prevent excessive tightening of the nut on the shaft and a positive connection in the second direction to loosen the nut, a bracket for adjustably mounting the motor beneath a working surface for supporting the components, and a spring retained between the motor and the socket for biasing the socket upward through the working surface and for permitting axial movement of the socket relative to the motor so that at least one of the components is allowed to rest firmly on the working surface.

9. The apparatus as recited in claim 8, further comprising a locating arm adjustably mounted to the working surface for positioning the one trophy component on the work surface adjacent the socket, the locating arm including a member having a surface for engaging the one component to prevent movement thereof during the assembly of the trophy.

10. The apparatus as recited in claim 9 further comprising a switch operable by the foot of a user to activate, deactivate, and control the direction of operation of the motor thereby leaving the user's hands free to align the trophy components prior to and during assembly of the trophy.

11. The apparatus as recited in claim 8 wherein the socket includes a recessed section at one of its ends for retaining the nut and an elongated cavity extending axially inward from the recessed section for receiving the shaft, the outer periphery of the recessed section being beveled to facilitate removal of the nut from the socket.

12. An apparatus for assembling trophies comprising a working surface for supporting the components of trophies for assembly, the working surface including at least one opening, an adjustable locating arm mounted to the working surface for positioning at least one of the components adjacent to the opening, a socket projecting through the opening in the working surface for engaging and connecting a nut to a threaded shaft to assemble the components of the trophy, a bidirectional motor coupled to the socket and operable in a first direction to tighten the nut on the shaft and in a second direction to loosen the nut, a clutch providing a torque-limited connection between the motor and the socket in the first direction to prevent excessive tightening of the nut, a bracket for mounting the motor beneath the working surface so that the socket projects upward through the opening, and a spring retained between the motor and the socket for biasing the socket upward through the opening and for permitting axial movement of the socket relative to the motor so that the one component rests firmly on the working surface.

* * * * *

UNITED STATES PATENT AND TRADEMARK OFFICE
CERTIFICATE OF CORRECTION

PATENT NO. : 4,318,317
DATED : March 9, 1982
INVENTOR(S) : Lowell B. Zerbe

It is certified that error appears in the above—identified patent and that said Letters Patent is hereby corrected as shown below:

On the title page, item [73] should read as follows:
--assignee: Earl M. Nonnenmann, Cumberland, Md. and Frank Mattox, Columbus, Ind. --.

Signed and Sealed this

Second Day of November 1982

[SEAL]

Attest:

GERALD J. MOSSINGHOFF

Attesting Officer  Commissioner of Patents and Trademarks